United States Patent
Tada

(10) Patent No.: US 9,838,658 B2
(45) Date of Patent: Dec. 5, 2017

(54) IMAGE PROCESSING APPARATUS THAT PERFORMS TONE CORRECTION, IMAGE PROCESSING METHOD, AND STORAGE MEDIUM

(71) Applicant: CANON KABUSHIKI KAISHA, Tokyo (JP)

(72) Inventor: Junji Tada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 14/674,282

(22) Filed: Mar. 31, 2015

(65) Prior Publication Data

US 2015/0281664 A1    Oct. 1, 2015

(30) Foreign Application Priority Data

Mar. 31, 2014    (JP) ................. 2014-072496

(51) Int. Cl.
| | |
|---|---|
| H04N 9/64 | (2006.01) |
| H04N 9/73 | (2006.01) |
| H04N 9/69 | (2006.01) |
| H04N 5/217 | (2011.01) |
| H04N 5/235 | (2006.01) |

(Continued)

(52) U.S. Cl.
CPC ............. *H04N 9/646* (2013.01); *H04N 5/202* (2013.01); *H04N 5/217* (2013.01); *H04N 5/2351* (2013.01); *H04N 9/045* (2013.01); *H04N 9/69* (2013.01); *H04N 9/735* (2013.01)

(58) Field of Classification Search
CPC ....... H04N 5/2351; H04N 9/646; H04N 5/202
See application file for complete search history.

(56) References Cited

U.S. PATENT DOCUMENTS

| | | | |
|---|---|---|---|
| 7,667,777 B2 | 2/2010 | Lee | |
| 2004/0246537 A1* | 12/2004 | Ohyama | H04N 5/202 358/479 |

(Continued)

FOREIGN PATENT DOCUMENTS

| | | |
|---|---|---|
| CN | 1734550 A | 2/2006 |
| CN | 1753506 A | 3/2006 |
| CN | 103327219 A | 9/2013 |

(Continued)

OTHER PUBLICATIONS

Office Action issued in Chinese Appln. No. 201510146524.6 dated Aug. 5, 2016. English translation provided.

*Primary Examiner* — Ahmed A Berhan
(74) *Attorney, Agent, or Firm* — Rossi, Kimms & McDowell LLP

(57) ABSTRACT

An image processing apparatus which is capable of properly performing tone correction without damaging the atmosphere of an image in shooting. Based on a luminance histogram for photographed data, an input lower limit and an input upper limit of luminance values for use in developing the photographed data are determined. Based on at least one of the input lower limit and the input upper limit, a reference level of a gamma curve for use in carrying out gamma correction on the photographed data is calculated. Gamma correction on the photographed data is performed using the input lower limit and the input upper limit and the gamma curve corresponding to the reference level.

12 Claims, 8 Drawing Sheets

(51) Int. Cl.
*H04N 9/04* (2006.01)
*H04N 5/202* (2006.01)

(56) References Cited

U.S. PATENT DOCUMENTS

| | | | | |
|---|---|---|---|---|
| 2005/0174590 A1* | 8/2005 | Kubo | ............... | H04N 1/622 358/1.9 |
| 2008/0111836 A1* | 5/2008 | Huang | ............ | G09G 3/2096 345/690 |

FOREIGN PATENT DOCUMENTS

| | | | |
|---|---|---|---|
| JP | 2002359773 A | 12/2002 | |
| JP | 2005268952 A | 9/2005 | |

* cited by examiner

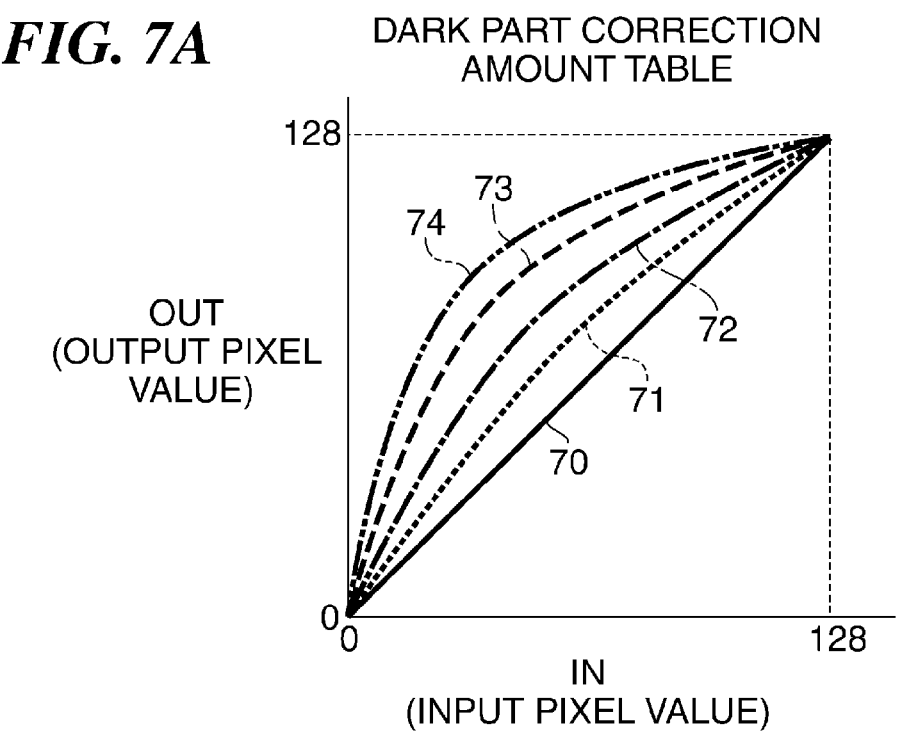
FIG. 7A  DARK PART CORRECTION AMOUNT TABLE
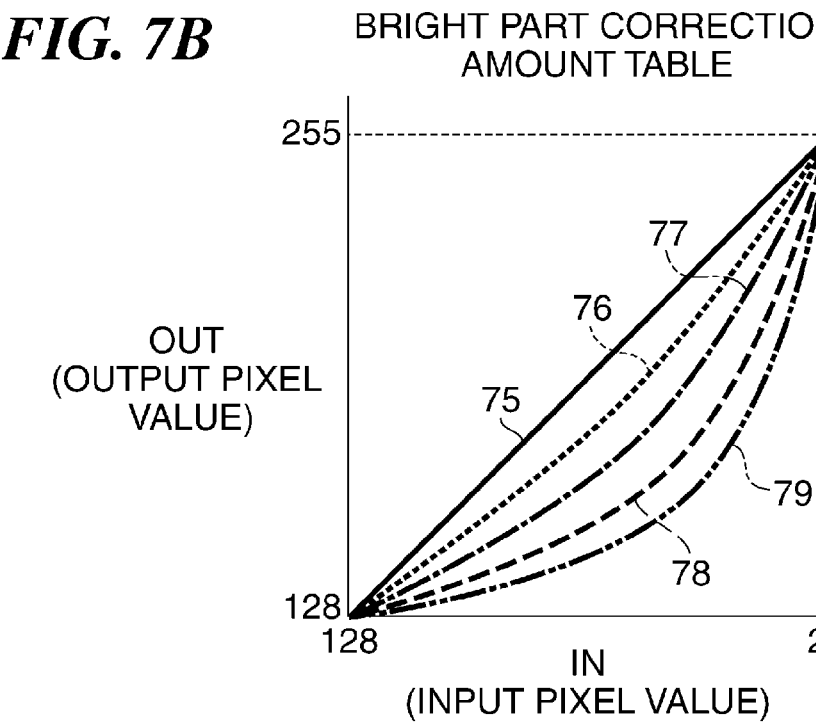
FIG. 7B  BRIGHT PART CORRECTION AMOUNT TABLE

IMAGE PROCESSING APPARATUS THAT PERFORMS TONE CORRECTION, IMAGE PROCESSING METHOD, AND STORAGE MEDIUM

BACKGROUND OF THE INVENTION

Field of the Invention

The present invention relates to image processing on photographed data taken by an image pickup apparatus, and in particular to an image processing apparatus and an image processing method which are capable of adaptively reflecting a dynamic range, which is stored as photographed data, to a developing result according to the photographed data, as well as a storage medium.

Description of the Related Art

In image pickup apparatuses such as digital cameras, a brightness adjustment is made to automatically correct the tone of photographed data to a target tone. For example, there is known a technique to analyze the tone and others of a dark part and a bright part in photographed data and automatically correct tone so that the overall photographed data can have a suitable tone. Specifically, there has been proposed a method in which, when the brightness of an object to be taken has changed, tone is corrected so that the object to be taken can be displayed with a predetermined brightness (see, for example, Japanese Laid-Open Patent Publication (Kokai) No. 2002-359773). There has also been proposed a method in which for photographed data, tone is corrected based on a reference value of exposure for shooting (see, for example, Japanese Laid-Open Patent Publication (Kokai) No. 2005-268952).

However, the techniques described in Japanese Laid-Open Patent Publication (Kokai) No. 2002-359773 and Japanese Laid-Open Patent Publication (Kokai) No. 2005-268952 present a problem that the atmosphere of an image in shooting is damaged because the overall brightness is corrected to a large extent in some scenes.

SUMMARY OF THE INVENTION

The present invention provides an image processing apparatus and an image processing method which are capable of properly performing tone correction without damaging the atmosphere of an image in shooting, as well as a storage medium.

Accordingly, a first aspect of the present invention provides an image processing apparatus which develops photographed data, comprising a dynamic range adjustment unit configured to, based on a luminance histogram for the photographed data, determine an input lower limit and an input upper limit of luminance values for use in developing the photographed data, a correction amount adjustment unit configured to, based on at least one of the input lower limit and the input upper limit determined by the dynamic range adjustment unit, calculate a reference level of a gamma curve for use in carrying out gamma correction on the photographed data, and a gamma correction unit configured to perform gamma correction on the photographed data using the input lower limit and the input upper limit and the gamma curve corresponding to the reference level calculated by the correction amount adjustment unit.

Accordingly, a second aspect of the present invention provides an image processing apparatus which develops photographed data, comprising a dynamic range adjustment unit configured to, based on a luminance histogram for the photographed data, determine an input lower limit and an input upper limit of luminance values for use in developing the photographed data, a correction amount adjustment unit configured to, based on a ratio of the input upper limit after adjustment by the dynamic range adjustment unit to a predetermined threshold value, calculate a reference level of a gamma curve for use in carrying out gamma correction on the photographed data, and a gamma correction unit configured to perform gamma correction on the photographed data using the input lower limit and the input upper limit and the gamma curve corresponding to the reference level calculated by the correction amount adjustment unit.

Accordingly, a third aspect of the present invention provides An image processing method for an image processing apparatus which develops photographed data, comprising a dynamic range adjustment step of, based on a luminance histogram for the photographed data, determining an input lower limit and an input upper limit of luminance values for use in developing the photographed data, a correction amount adjustment step of, based on at least one of the input lower limit and the input upper limit determined in the dynamic range adjustment step, calculating a reference level of a gamma curve for use in carrying out gamma correction on the photographed data, and a gamma correction step of performing gamma correction on the photographed data using the input lower limit and the input upper limit and the gamma curve corresponding to the reference level calculated in the correction amount adjustment step.

Accordingly, a fourth aspect of the present invention provides an image processing method for an image processing apparatus which develops photographed data, comprising a dynamic range adjustment step of, based on a luminance histogram for the photographed data, determining an input lower limit and an input upper limit of luminance values for use in developing the photographed data, a correction amount adjustment step of, based on a ratio of the input upper limit after adjustment in the dynamic range adjustment step to a predetermined threshold value, calculating a reference level of a gamma curve for use in carrying out gamma correction on the photographed data, and a gamma correction step of performing gamma correction on the photographed data using the input lower limit and the input upper limit and the gamma curve corresponding to the reference level calculated in the correction amount adjustment step.

Accordingly, a fifth aspect of the present invention provides a non-transitory computer-readable storage medium storing a control program for causing a computer to execute an image processing method for an image processing apparatus which develops photographed data, the image processing method comprising a dynamic range adjustment step of, based on a luminance histogram for the photographed data, determining an input lower limit and an input upper limit of luminance values for use in developing the photographed data, a correction amount adjustment step of, based on at least one of the input lower limit and the input upper limit determined in the dynamic range adjustment step, calculating a reference level of a gamma curve for use in carrying out gamma correction on the photographed data, and a gamma correction step of performing gamma correction on the photographed data using the input lower limit and the input upper limit and the gamma curve corresponding to the reference level calculated in the correction amount adjustment step.

Accordingly, a sixth aspect of the present invention provides a non-transitory computer-readable storage medium storing a control program for causing a computer to execute an image processing method for an image processing apparatus which develops photographed data, the image processing method comprising a dynamic range adjustment step of, based on a luminance histogram for the photographed data, determining an input lower limit and an input upper limit of luminance values for use in developing the photographed data, a correction amount adjustment step of, based on a ratio of the input upper limit after adjustment in the dynamic range adjustment step to a predetermined threshold value, calculating a reference level of a gamma curve for use in carrying out gamma correction on the photographed data, and a gamma correction step of performing gamma correction on the photographed data using the input lower limit and the input upper limit and the gamma curve corresponding to the reference level calculated in the correction amount adjustment step.

According to the present invention, a suitable level of a gamma curve is shifted toward a high-luminance side when a dynamic range is extended. The suitable level of the gamma curve is shifted toward a low-luminance side when the dynamic range is compressed to a predetermined value or greater. As a result, tone is properly corrected without damaging the atmosphere of an image in shooting.

Further features of the present invention will become apparent from the following description of exemplary embodiments (with reference to the attached drawings).

BRIEF DESCRIPTION OF THE DRAWINGS

FIGS. 7A and 7B are views showing examples of a dark part correction amount table and a bright part correction amount table which are used in the step S308 in FIG. 3.

DESCRIPTION OF THE EMBODIMENTS

The present invention will now be described in detail with reference to the drawings showing an embodiment thereof.

Figure 1:
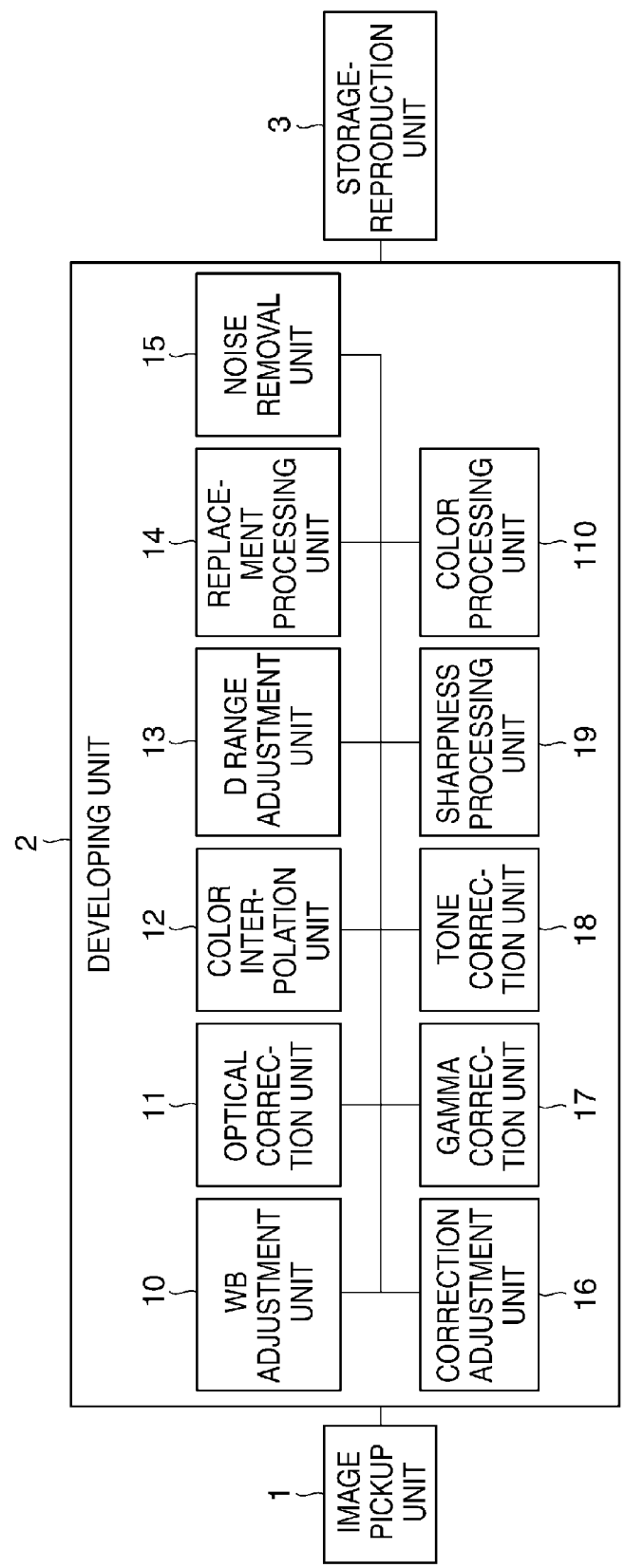
FIG. 1 is a block diagram schematically showing an arrangement of an image pickup apparatus according to an embodiment of the present invention.

FIG. 1 is a block diagram schematically showing an arrangement of an image pickup apparatus 100 according to an embodiment of the present invention. The image pickup apparatus 100 is typically a digital still camera or a digital video camera having a movie shooting function, but the image pickup apparatus 100 is not limited to this and may be any of various electronic apparatuses having a camera function (a shooting function of obtaining an image (video) using an image pickup device). For example, the image pickup apparatus 100 may be a mobile communication terminal (a cellular phone, a smartphone, or the like) with a camera function, a mobile computer (a tablet computer, a laptop computer, or the like) with a camera function, or a mobile game machine with a camera function.

The image pickup apparatus 100 is comprised mainly of an image pickup unit 1, a developing unit 2, and a storage-reproduction unit 3. It should be noted that the image pickup apparatus 100 has a central control unit (CPU), not shown, which controls the overall operation of the image pickup apparatus 100. The image pickup unit 1, the developing unit 2, and the storage-reproduction unit 3 carry out predetermined operations and processes under the control of the central control unit (CPU).

The image pickup unit 1 has various lenses such as a zoom lens and a focus lens, a diaphragm, an image pickup device such as a CMOS image sensor, an A/D converter, a photometric measurement sensor, and so on and generates photographed data (hereafter referred to as "RAW data"). It should be noted that Raw data includes undeveloped photographed data and photographed data to which a part of a developing process is subjected. The developing unit 2 develops RAW data generated by the image pickup unit 1 to generate developed data.

The storage-reproduction unit 3 stores RAW data generated by the image pickup unit 1 and developed data generated by the developing unit 2 in a storage medium and also reads RAW data and developed data stored in the storage medium. It should be noted that the image pickup apparatus 100 is also able to read RAW data stored in the storage-reproduction unit 3 with arbitrary timing and develop the same.

The developing unit 2 has a white balance adjustment unit 10 (hereafter referred to as "the WB adjustment unit 10"). The WB adjustment unit 10 multiplies signal values of respective color signals by white balance coefficients (hereafter referred to as "WB coefficients") to adjust levels of the respective color signals so that a gray subject can be output in gray with levels of the respective color signals being uniform. WB coefficients are gains varying with the color signals. The image pickup unit 1 stores, as RAW data, WB coefficients as well as signal values from the image pickup device and multiplies the signal values of the respective color signals by WB coefficients, so that the color signals have the same signal value in a gray subject.

It should be noted that WB coefficients may be stored with consideration with the assumption that shooting is performed under a standard light source. Also, WB coefficients may be calculated based on color temperatures input by a user or may be calculated by extracting signal values of the respective color signals from a part of RAW data or developed data. The WB adjustment unit 10 may not use WB coefficients stored as RAW data but may calculate WB coefficients using a method designated by the user at the time of development and use the same.

Figure 2:
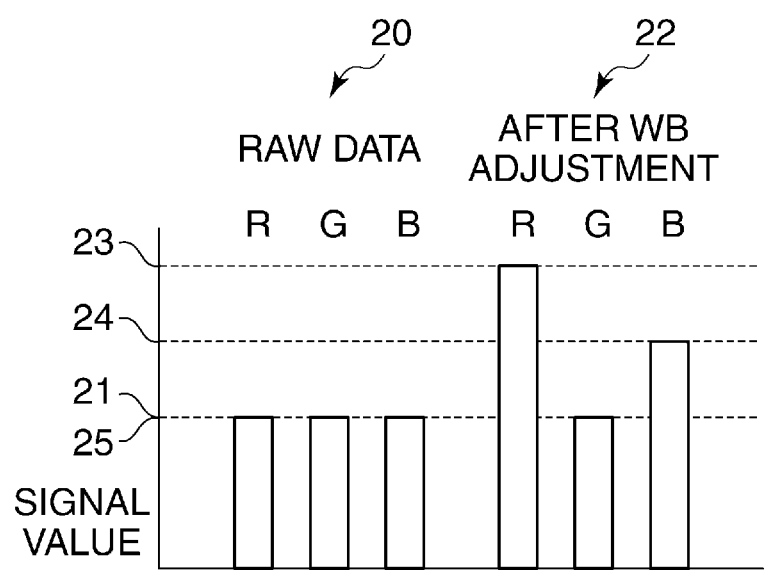
FIG. 2 is a diagram showing an exemplary WB adjustment process which is carried out by a WB adjustment unit which a developing unit has.

FIG. 2 is a diagram showing an exemplary WB adjustment process which is carried out by the WB adjustment unit 10. In FIG. 2, the axis of ordinate indicates the magnitudes of signal values. Signal values 20 in FIG. 2 are signal values of the respective color signals stored as RAW data. A sensor saturation value 21 is an upper limit to the signal values 20 and determined by a spectral sensitivity characteristic of an image pickup device, the processing accuracy of the image pickup unit 1, and a predetermined threshold value. In the example shown in FIG. 2, the sensor saturation value 21 is the same for the color signals, but the sensor saturation value 21 may vary with the color signals.

Signal values 22 in FIG. 2 are signal values after WB adjustment obtained by the WB adjustment unit 10 multiplying the signal values 20 of the respective color signals by WB coefficients. Multiplying the signal values 20 by WB coefficients changes upper limits to the respective color signals. In the example shown in FIG. 2, it is assumed that a WB coefficient for the color signal R is "2", a WB coefficient for the color signal B is "1.5", and a WB coefficient for the color signal G is "1". Thus, a saturation level 23 for the color signal R is twice as large as the sensor saturation value 21, a saturation level 24 for the color signal B is 1.5 times as large as the sensor saturation value 21, and a saturation level 25 for the color signal G is equal to the sensor saturation value 21.

The developing unit 2 also has an optical correction unit 11, a color interpolation unit 12, a dynamic range adjustment unit 13 (hereafter referred to as "the D range adjustment unit 13"), a replacement processing unit 14, and a noise removal unit 15. The developing unit 2 also has a correction amount advisement unit 16, a gamma correction unit 17, a tone correction unit 18, a sharpness processing unit 19, and a color processing unit 110.

It should be noted that the image pickup unit 1 may be equipped with a part of these component elements (including the WB adjustment unit 10) which the developing unit 2 has, and also, the developing unit 2 may be equipped with other processing units. Moreover, the component elements which the developing unit 2 has may be functional blocks of the central control unit itself or may be functional blocks which perform predetermined functions under the control of the central control unit.

The optical correction unit 11, for example, reduces peripheral illumination arising from various lenses of the image pickup unit 1, corrects for chromatic aberration of magnification, eliminates axial chromatic aberration, and corrects for distortion. The color interpolation unit 12 demosaics pixels comprised of monochrome signals. The D range adjustment unit 13 determines an input lower limit Bk and an input upper limit Wt of luminance values (that is, an input lower limit Bk and an input upper limit Wt of gamma curves) for use in development. The replacement processing unit 14 replaces a color signal nearly saturated with another color signal for each pixel. The noise removal unit 15 removes luminance noise and color noise by a filtering process, a hierarchical process, or the like.

The correction amount adjustment unit 16 calculates a reference level of a gamma curve for use in gamma correction performed on an input signal (photographed data to be processed in steps S301 to S303 and S307, to be described later) and generates tone correction tables. It should be noted that the reference level means a level of an input signal targeted for a signal after gamma correction.

In the description of the present embodiment, it is assumed that a level of an input signal targeted for a signal after gamma correction is set at a luminance value (luminance level) enabling correct exposure, and more specifically, a luminance value (luminance level) in a case where gray with a reflectivity of 18% is shot. Accordingly, in the following description, the reference level is expressed as a suitable level. It should be noted that a targeted level should not always set in the way described above but may be set according to a shooting scene or may be set by a user.

The gamma correction unit 17 carries out a gamma correction process in which it adjusts the contrast and dynamic range of the entire taken image using the input lower limit Bk and the input upper limit Wt determined by the D range adjustment unit 13 and a gamma curve determined by the correction amount adjustment unit 16.

The tone correction unit 18 corrects tone of local luminance of only a dark part or a bright part according to tone correction tables generated by the correction amount adjustment unit 16. The sharpness processing unit 19 enhances an edge of an image to adjust the sharpness of the entire image. The color processing unit 110 adjusts the hue of an image and suppresses color curving in a high-luminance region. Although in FIG. 1, the processing units of the developing unit 2 are shown in the order of preferable processes, and such effects as noise reduction and reduction of coloring on an edge are obtained, but this order is not limitative.

Figure 3:
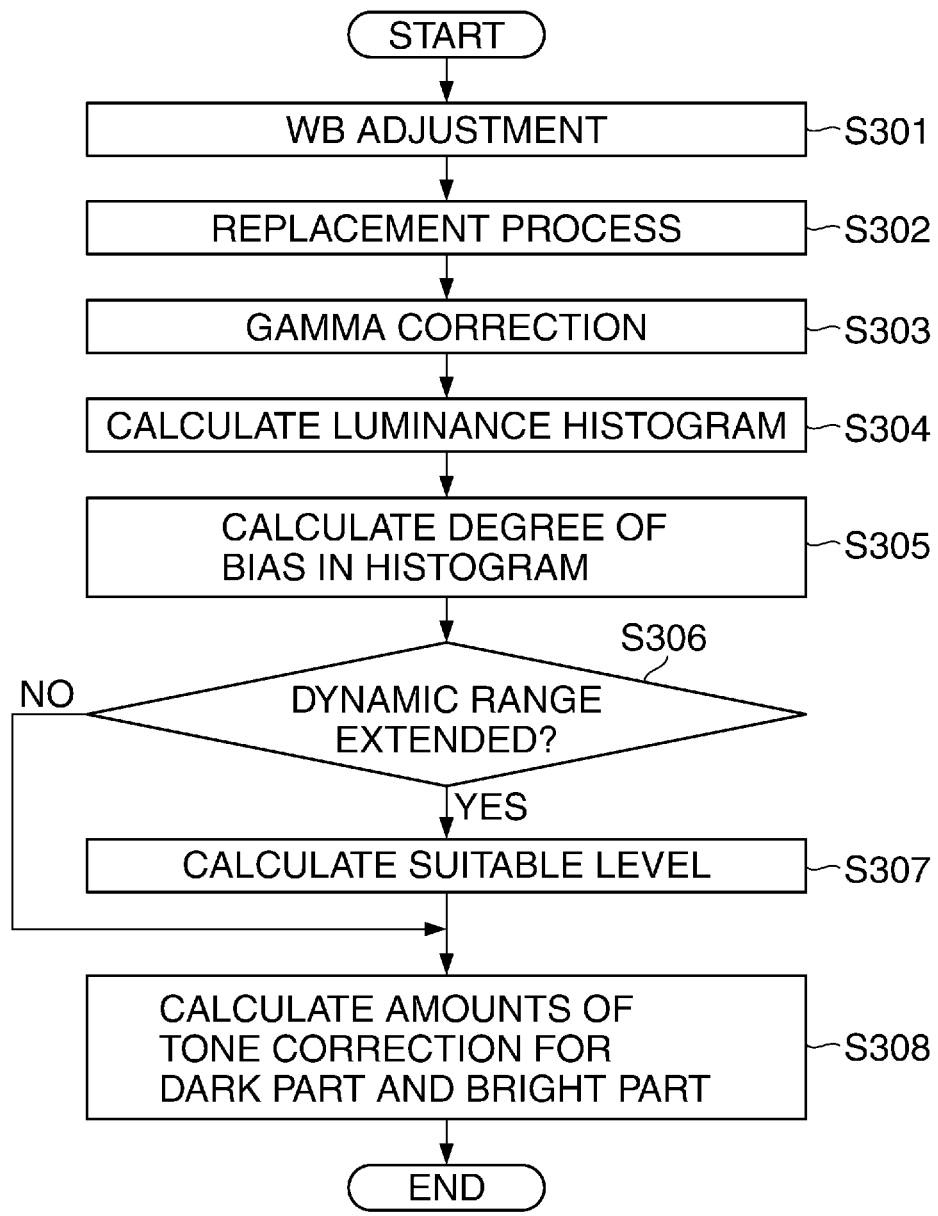
FIG. 3 is a flowchart of a first determination method for the amount of tone correction, which is carried out by the developing unit.

Referring to FIGS. 3 to 7, a description will be given of a first determination method for the amount of tone correction. FIG. 3 is a flowchart showing the first determination method for the amount of tone correction, which is carried out by the developing unit 2. It should be noted that processes in FIG. 3 are implemented by the central control unit (CPU), not shown, which controls the overall operation of the image pickup apparatus 100, executing predetermined programs and controlling operation of the component elements constituting the developing unit 2.

In step S301, the WB adjustment unit 10 makes a WB adjustment by multiplying signal values of respective color signals in RAW data by WB coefficients. In step S302, the replacement processing unit 14 replaces a color signal nearly saturated with another color signal. For this replacement process, a well-known technique (for example, the technique described in Japanese Laid-Open Patent Publication (Kokai) No. 2004-328564, Japanese Laid-Open Patent Publication (Kokai) No. 2012-85360, or the like) may be used, but detailed description thereof is omitted here.

In step S303, the gamma correction unit 17 carries out a gamma correction process on photographed data which has been subjected to the process in the step S302. Here, the gamma correction unit 17 performs tone conversion using gamma curves calculated based on the input lower limit Bk and the input upper limit Wt determined by the D range adjustment unit 13. The input lower limit Bk and the input upper limit Wt can be, for example, luminance values in the bottom 1% and top 1% of photographed data.

In step S304, the correction amount adjustment unit 16 calculates a luminance histogram for photographed data which has been subjected to the gamma correction in the step S303. Specifically, an RGB signal after the gamma correction in the step S303 is converted into a luminance value (Y) to calculate a luminance histogram for the overall photographed data. It should be noted that for example, an equation 1 below may be used for conversion from an RGB signal into a luminance value (Y).

In step S305, the correction amount adjustment unit 16 which acts as bias calculation means for calculating the degree of bias in a luminance histogram calculates the degrees of bias on a lower luminance side and a higher luminance side relative to a central luminance.

For example, equations 2 and 3 below may be used to calculate the degree of bias in a luminance histogram. The equations 2 and 3 are for calculating the degree of bias (var1) on a lower luminance side relative to a central luminance in a luminance histogram of which the number of tones 256 and the degree of bias (var2) on a higher luminance side relative to the central luminance. It should be noted that in the equations 2 and 3, "Y[i]" is a histogram frequency for a luminance value i.

[Mathematical Expression 1]

$$Y = \frac{77R + 150G + 29B}{256}$$ Equation 1

$$\text{var1} = \sum_{i=0}^{127} (128 - i)^2 \times y[i]$$ Equation 2

$$\text{var2} = \sum_{i=129}^{255} (128 - i)^2 \times y[i]$$ Equation 3

In step S306, the correction amount adjustment unit 16 determines whether or not a dynamic range after the adjustment using the input lower limit Bk and the input upper limit Wt determined by the D range adjustment unit 13 is wider than a dynamic range before the adjustment (whether or not the dynamic range has extended due to adjustment). When the dynamic range has become wider (YES in the step S306), the process proceeds to step S307, and when the dynamic range has not become wider (NO in the step S306), the process proceeds to step S308.

Figure 4:
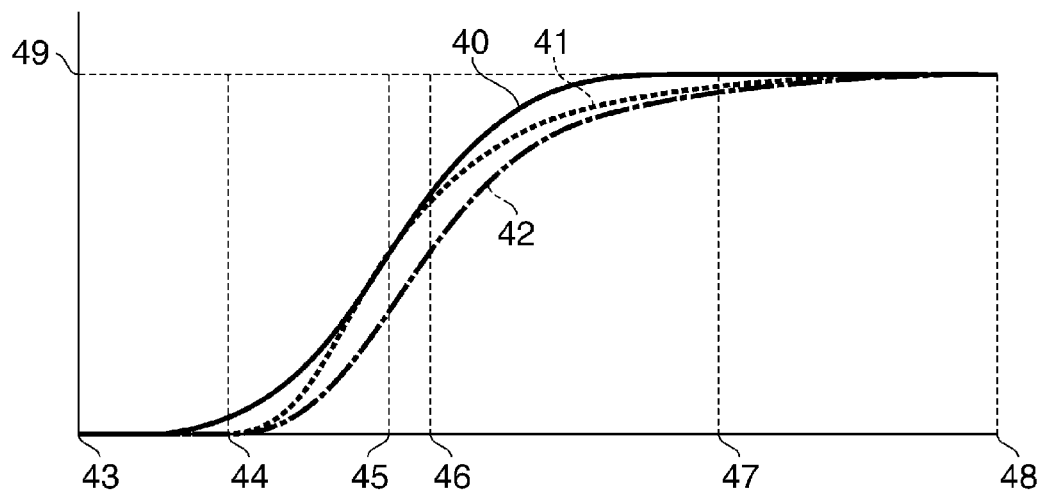
FIG. 4 is a diagram schematically showing a process in which suitable levels for gamma curves are calculated by a correction amount adjustment unit, which the developing unit has, in step S307 in FIG. 3.

In the step S307, the correction amount adjustment unit 16 calculates suitable levels of gamma curves. FIG. 4 is a diagram schematically showing a process in which suitable levels of gamma curves are calculated in the step S307. FIG. 4 show three gamma curves, i.e. a first gamma curve 40, a second gamma curve 41, and a third gamma curve 42.

The first gamma curve 40 is a gamma curve in a case where no dynamic range adjustment is made. The second gamma curve 41 is a gamma curve of which a suitable level is the same as that before dynamic range adjustment and for which an input lower limit and an input upper limit have been adjusted. The third gamma curve 42 is a gamma curve obtained by adjusting the suitable level of the second gamma curve 41.

Referring to FIG. 4, an input lower limit 43 is an input lower limit to the first gamma curve 40, and an input lower limit 44 is an input lower limit to the second gamma curve 41 and the third gamma curve 42. A suitable level 45 is a suitable level of the first gamma curve 40 and the second gamma curve 41, and a suitable level 46 is a suitable level of the third gamma curve 42.

An input upper limit 47 is an input upper limit to the first gamma curve 40. An input upper limit 48 is an input upper limit to the second gamma curve 41 and the third gamma curve 42. It should be noted that these values (43 to 48) are expressed on a log scale. An output upper limit 49 is an output upper limit after gamma correction.

The gradient of the second gamma curve 41 which has been adjusted so as to extend the dynamic range without changing the suitable level of the first gamma curve 40 is smaller on a higher luminance side relative to the suitable level, and hence the tone is poor in this luminance range. On the other hand, the third gamma curve 42 is adjusted by shifting the suitable level toward a high luminance side, and hence the tone on the high luminance side is made close to the first gamma curve 40 (the gradient is kept constant) in the case where no dynamic range adjustment is carried out.

Also, the suitable level of the third gamma curve 42 is shifted toward the high luminance side, and as a result, the tone on the low luminance side as well is made close to the first gamma curve 40 in the case where no dynamic range adjustment is carried out. An exemplary equation 4 for computation of a suitable level is given below.

[Mathematical Expression 2]

$$\text{MidNew} = \text{Mid} \times \left(\frac{BK1}{BK2}\right)^{1-K_1} \times \left(\frac{Wt2}{Wt1}\right)^{K_1}$$ Equation 4

In the above equation 4, "Bk1" is a value (luminance value) of the input lower limit 43, "Wt1" is a value (luminance value) of the input upper limit 47, and "Wt2" is a value (luminance value) of the input upper limit 48. Also, "Mid" is a value (luminance value) of a suitable level (suitable level 45) before shifting, and "MidNew" is a value (luminance value) of a suitable level (suitable level 46) after shifting.

"$K_1$" is a correction coefficient which assumes values from 0 to 1 and determines a ratio between portions of a dynamic range extension assigned to a low luminance side and a high luminance side relative to a suitable level. Thus, according to the above equation 4, a suitable level is adjusted based on at least one of the ratio between dynamic ranges on a lower luminance side relative to the suitable level before and after dynamic range adjustment and the ratio between dynamic ranges on a higher luminance side relative to the suitable level before and after dynamic range adjustment. It is preferred that a suitable level is adjusted so that the ratio between a dynamic range on a lower luminance side relative to the suitable level and the ratio between a dynamic range on a higher luminance side relative to the suitable level can be kept constant before and after gamma correction.

Figure 5:
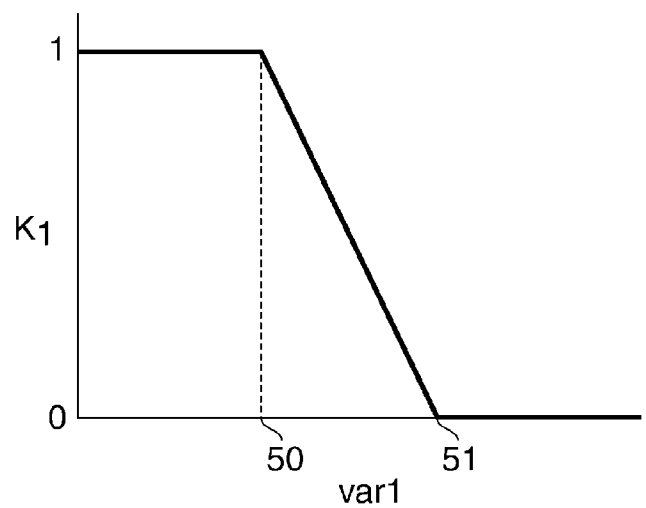
FIG. 5 is a view showing a table of the relationship between a correction coefficient $K_1$ and the degree of bias (var1) on a low luminance side of a luminance histogram, the table being used in step S307 in FIG. 3.

The value of the correction coefficient $K_1$ is determined according to the degree of bias (var1) on the low luminance side of the luminance histogram calculated in the step S305. FIG. 5 is a view showing a table of the relationship between the correction coefficient $K_1$ and the degree of bias (var1) on the low luminance side of the luminance histogram. A first threshold value 50 and a second threshold value 51 in FIG. 5 are for switching values of the correction coefficient $K_1$ and set in advance with consideration given to the amount of tone correction in the step S308 in a later stage.

When the degree of bias (var1) on the low luminance side of the luminance histogram is small, the correction coefficient $K_1$ is set at 1, and by assigning a dynamic range extension only to the low luminance side in this manner, the tone on the high luminance side is maintained. However, as with the third gamma curve in FIG. 4, this leads to an adverse result in scenes where a dark part is desired to be bright because gamma output values are corrected to low luminance values as a whole.

Accordingly, when the degree of bias (var1) on the low luminance side of the luminance histogram is large, the amount of tone correction for the dark part calculated in the step S308 is large, and hence setting the correction coefficient $K_1$ at a small value in advance makes the shift amount of the suitable level modest and prevents the image from being dark. Simply, by keeping the correction coefficient $K_1$ at 0.5, portions of a dynamic range extension are equally assigned to the low luminance side and the high luminance side.

It is preferred that a limit is placed on the shift amount of the suitable level (the amount of change in the value of the suitable level before and after calculation) so as to prevent MidNew, which is the result of calculation using the equation 4, from greatly changing from Mid. Strictly, the gamma shape is changed by changing the suitable level in the step S307, and hence it is preferred that the steps S304 and S305 are performed again to recalculate the degree of bias from the central luminance in the luminance histogram, and then the amount of tone correction for the dark part and the bright part are calculated in the step S308. It should be noted that when the shift amount of the suitable level is small, this process may be dispensed with because the image quality is less likely to be affected.

In the step S308, the correction amount adjustment unit 16 calculates the amounts of tone correction for the dark part and the bright part (determines tone correction tables). In the step S308, first, the correction amount adjustment unit 16 determines the degrees of correction for the dark part and the bright part, respectively, according to a dark part correction degree table and a bright part correction degree table. Examples of the dark part correction degree table and the bright part correction degree table are shown in FIGS. 6A and 6B.

Figure 6A:
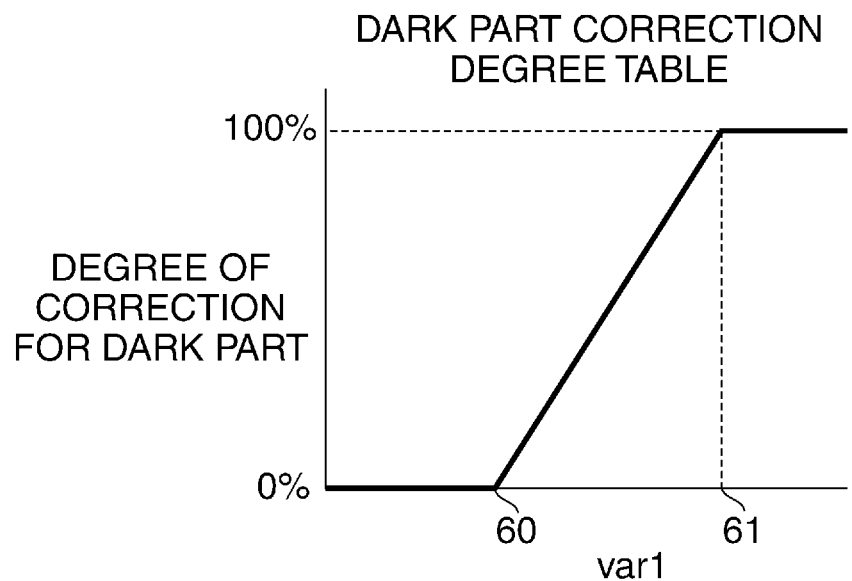
FIGS. 6A and 6B are views showing examples of a dark part correction degree table and a bright part correction degree table which are used in step S308 in FIG. 3.
Figure 6B:
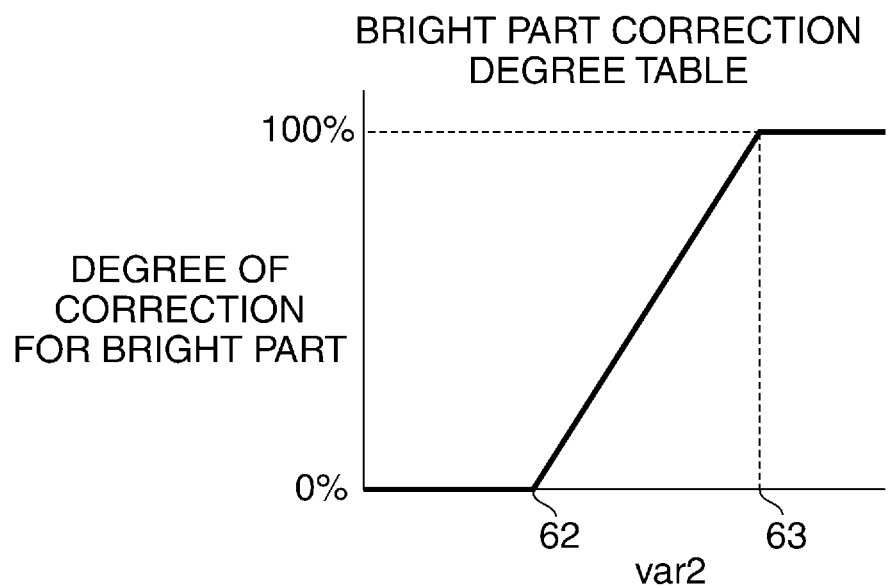

Threshold values 60, 61, 62, and 63 in FIGS. 6A and 6B are for use in determining the degree of correction and set as fixed values in advance. Here, for the degree of bias in the low luminance side of the luminance (var1) and the degree of bias in the high luminance side of the luminance (var2), they are set so that when the degree of bias is small, the degree of correction can be small, and when the degree of bias is large, the degree of correction can be large. This is because leveling-out of the luminance histogram is aimed at.

Subsequently, in the step S308, the correction amount adjustment unit 16 determines tone correction tables according to a dark part correction amount table and a bright part correction amount table which are held in advance. Examples of the dark part correction amount table and the bright part correction amount table are shown in FIGS. 7A and 7B.

Correction tables 70, 71, 72, 73, and 74 show the amounts of correction in cases where the degree of correction for the dark part is 0%, 25%, 50%, 75%, and 100%, respectively. Correction tables 75, 76, 77, 78, and 79 show the amounts of correction in cases where the degree of correction for the bright part is 0%, 25%, 50%, 75%, and 100%, respectively. The correction amount adjustment unit 16 determines tone correction tables to be used by the tone correction unit 18 by selecting correction tables according to the degrees of correction determined previously.

It should be noted that to correct tone based on the determined amounts of correction, the tone correction unit 18 may use a tone curve correction method, or a color dodge correction method in which correction is carried out with a local constant being maintained. Moreover, an interface that allows the user to select the intensity of correction from "low", "standard", and "high" may be prepared in advance, and according to a setting selected by the user, the tables in FIGS. 6A and 6B and the tables in FIGS. 7A and 7B may be switched to respective other similar tables. The execution of the step S308 is followed by terminating the present process.

As described above, according to the first determination method for the amount of tone correction, when a dynamic range is extended, a suitable level of a gamma curve is controlled to be shifted toward a high luminance side. This prevents the tone from being poor within a scope which does not damage the atmosphere of brightness in shooting.

Figure 8:
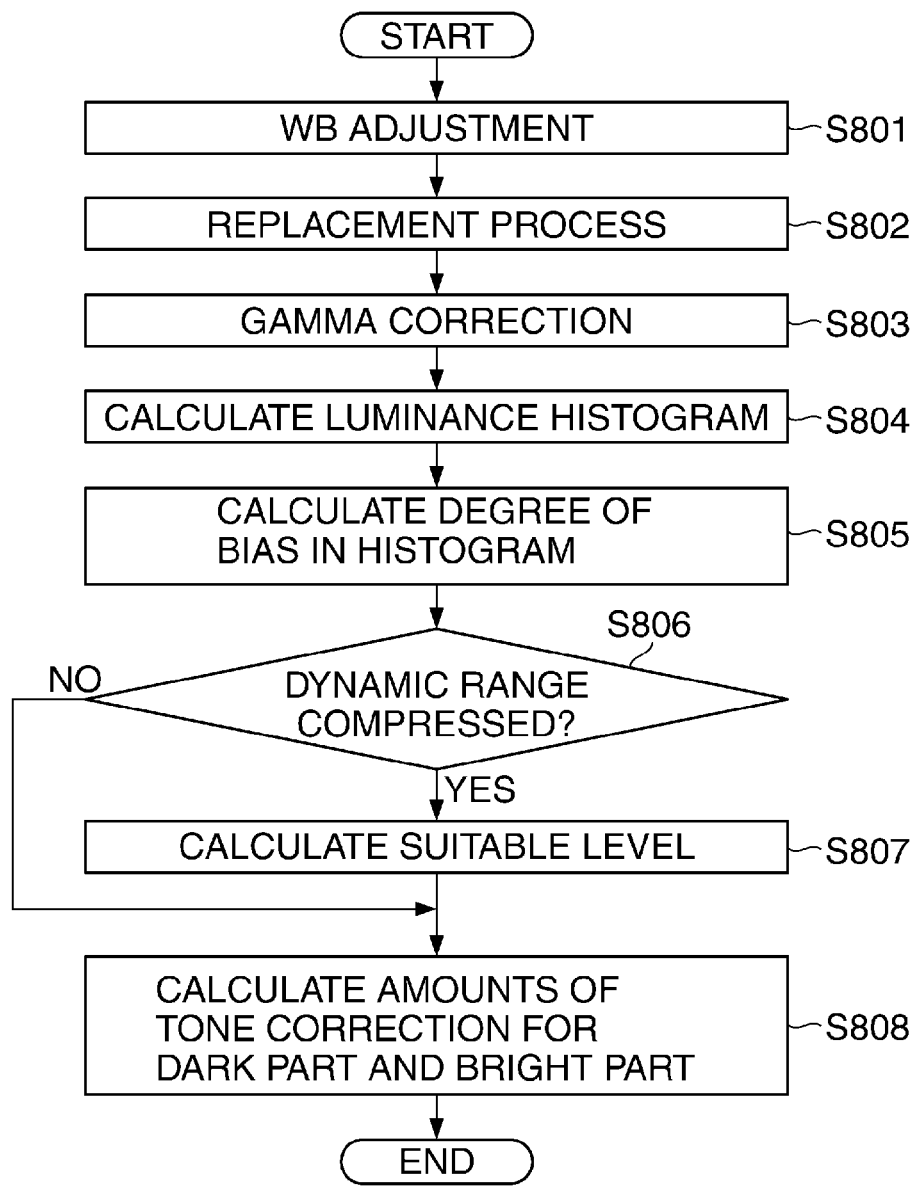
FIG. 8 is a flowchart showing a second determination method for the amount of tone correction, which is carried out by the developing unit.
Figure 9:
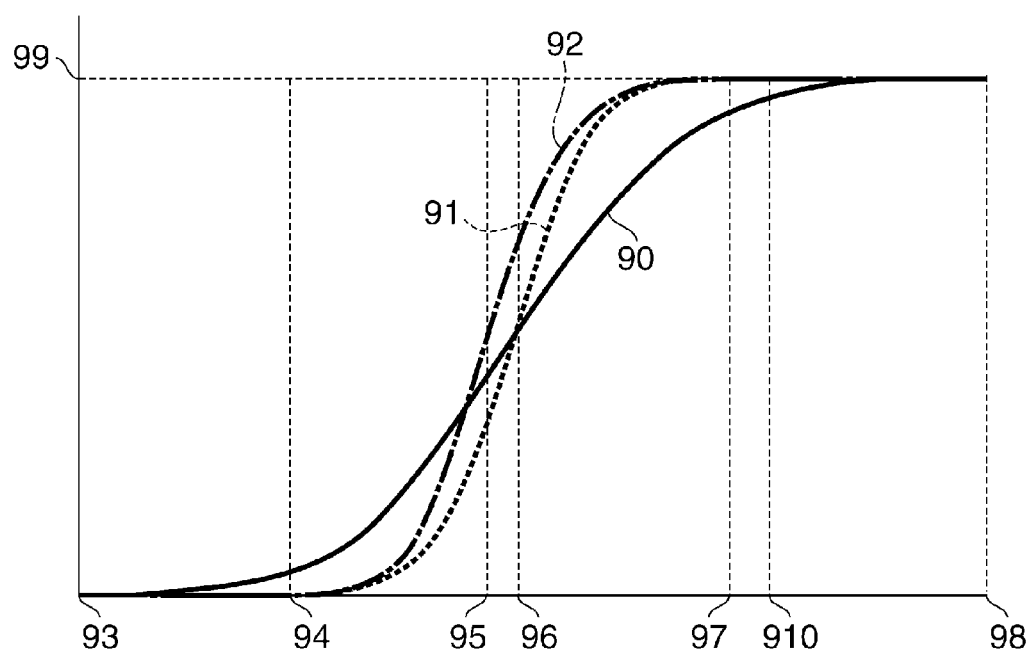
FIG. 9 is a diagram schematically showing a process in which suitable levels for gamma curves are calculated by the correction amount adjustment unit, which the developing unit has, in step S807 in FIG. 8.
Figure 10:
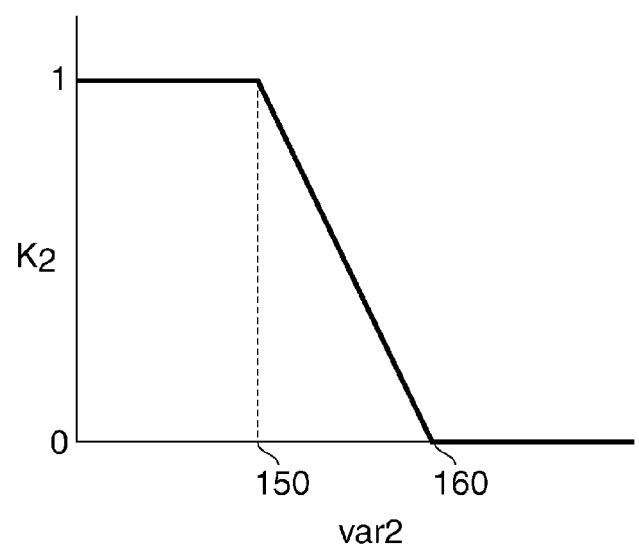
FIG. 10 is a view showing a table of the relationship between a correction coefficient $K_1$ and the degree of bias (var2) on a high luminance side of a luminance histogram, the table being used in step S807 in FIG. 8.

Referring to FIGS. 8 to 10, a description will now be given of a second determination method for the amount of tone correction. FIG. 8 is a flowchart showing the second determination method for the amount of tone correction, which is carried out by the developing unit 2. It should be noted that processes in FIG. 8 are implemented by the central control unit (CPU), not shown, which controls the overall operation of the image pickup apparatus 100, executing predetermined programs and controlling the operation of the component elements constituting the developing unit 2.

Processes in the steps S801 to S805 and S808 in FIG. 8 are the same as those in the steps S301 to S305 and S308 in FIG. 3, and hence description thereof is omitted here. In step S806, the correction amount adjustment unit 16 determines whether or not a dynamic range after adjustment using the input lower limit Bk and the input upper limit Wt calculated by the D range adjustment unit 13 is narrower than a predetermined dynamic range.

When the adjusted dynamic range is narrower than the predetermined dynamic range (YES in the step S806), the process proceeds to step S807, and when the adjusted dynamic range is not narrower than the predetermined dynamic range (NO in the step S806), the process proceeds to the step S808.

In the step S807, the correction amount adjustment unit 16 calculates a suitable level of a gamma curve. FIG. 9 is a diagram schematically showing a process in which a suitable level of a gamma curve is calculated in the step S807. In FIG. 9, a first gamma curve 90 is a gamma curve in a case where no dynamic range adjustment is made. A second gamma curve 91 is a gamma curve of which a suitable level is the same as that before dynamic range adjustment and for which an input lower limit and an input upper limit value have been adjusted. A third gamma curve 92 is a gamma curve obtained by adjusting the suitable level of the second gamma curve 91.

An input lower limit 93 is an input lower limit to the first gamma curve 90. An input lower limit 94 is an input lower limit to the second gamma curve 91 and the third gamma curve 92. A suitable level 95 is a suitable level of the third gamma curve 92. A suitable level 96 is a suitable level of the first gamma curve 90 and the second gamma curve 91. An input upper limit 97 is an input upper limit to the second gamma curve 91 and the third gamma curve 92.

An input upper limit 98 is an input upper limit to the first gamma curve 90. A threshold value 910 is a threshold value for an input upper limit in shifting a suitable level and set in advance. These values (93 to 98, 910, to be described later) are expressed on a log scale. An output upper limit 99 is an output upper limit after gamma correction.

As is apparent from the second gamma curve 91 in FIG. 9, when a dynamic range is adjusted so as to be compressed without changing a suitable level, the gradient of the gamma curve is greater on a higher luminance side relative to the suitable level.

Here, when the gradient of the gamma curve is too high, an image tends to be unnatural because the tone is too steep. For this reason, the threshold value 910 is set in advance, and when the input upper limit becomes smaller than the threshold value 910, the suitable level is shifted to a low luminance side, thus making the gradient of the gamma curve low. An exemplary equation 5 for use in calculation of the suitable level in this case is given below.

[Mathematical Expression 3]

$$MidNew = Mid \times \left(\frac{Wt2}{Wt\_th}\right)^{K_2} \quad \text{Equation 5}$$

In the above equation 5, "Wt2" is a value (luminance value) of the input upper limit 97, and "Wt_th" is a value (luminance value) of the threshold value 910 in FIG. 9. "Mid" is a value (luminance value) of a suitable level (suitable level 96) before shifting, and "MidNew" is a value (luminance value) of a suitable level (suitable level 95) after shifting. "$K_2$" is a correction coefficient assuming values from 0 to 1 and used to control the ratio at which the suitable level is shifted with respect to an amount for which an input upper limit is set at a value equal to or smaller than the threshold value 910. The value of the correction coefficient $K_2$ is determined according to the degree of bias (var2) on the high luminance side of the luminance histogram calculated in the step S805.

Namely, according to the first determination method described earlier, an image is darkened when a suitable level is shifted toward a high luminance side, and hence as for an image of which the tone is desired to be corrected so that a dark part can be bright, the correction coefficient $K_1$ is set so that the shift amount of a suitable level can be small.

Conversely, according to the second determination method, an image is lightened when a suitable level is shifted toward a low luminance side, and hence as for an image of which the tone is desired to be corrected so that a bright part can be dark, the correction coefficient $K_2$ is set so that the shift amount can be small.

FIG. 10 is a view showing a table of the relationship between the correction coefficient $K_2$ and the degree of bias (var2) on the high luminance side of the luminance histogram. A first threshold value 150 and a second threshold value 160 in FIG. 10 are for switching values of the correction coefficient $K_2$ and set in advance with consideration given to the amount of tone correction in the step S808 in a later stage.

As described above, according to the second determination method for the amount of tone correction, when a dynamic range is compressed to a predetermined value or greater, a suitable level of a gamma curve is controlled to shift toward a low luminance side. As a result, an image is prevented from being unnatural due to a too steep tone within a scope which does not damage the atmosphere of brightness in shooting.

It should be noted that in the present embodiment described above, the image pickup apparatus 100 comprised of the image pickup unit 1, the developing unit 2, and the storage-reproduction unit 3 is taken as an exemplary image processing apparatus. The present invasion, however, is not limited to this, but the image pickup unit 1, the developing unit 2, and the storage-reproducing unit 3 may be configured as separate apparatuses capable of communicating with one another.

For example, the present invention may be arranged such that RAW data taken and generated by a camera is transmitted to an external image processing apparatus (for example, a personal computer) via a network, the image processing apparatus develops the RAW data, and the developed data is stored in a storage device connected to the image processing apparatus so that they can communicate with each other.

The developing unit 2 does not need to process RAW data, which is taken by a camera, in real time, but may be an apparatus, such as a typical personal computer, which is capable of reading RAW data stored in a storage medium and performing the development process described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-072496, filed Mar. 31, 2014, which is hereby incorporated by reference herein in its entirety.

What is claimed is:

1. An image processing apparatus which develops photographed data, comprising:
   a storage device; and
   a processor configured to execute computer executable instructions recorded on the storage device, the computer executable instructions including instructions, that when executed by the processor, cause the image processing apparatus to:
   determine, based on a luminance histogram for the photographed data, an input lower limit and an input upper limit of luminance values for use in developing the photographed data;
   calculate, based on at least one of the determined input lower limit and the determined input upper limit, a reference level of a gamma curve for use in carrying out gamma correction on the photographed data; and
   perform gamma correction on the photographed data using the determined input lower limit and the determined input upper limit and the gamma curve corresponding to the calculated reference level.

2. The image processing apparatus according to claim 1, wherein the computer executable instructions further include instructions, that when executed by the processor, cause the image processing apparatus to adjust the reference level so that a ratio between a dynamic range on a low luminance side relative to the reference level and a ratio between a dynamic range on a high luminance side relative to the reference level are kept constant before and after the gamma correction.

3. The image processing apparatus according to claim 1, wherein the computer executable instructions further include instructions, that when executed by the processor, cause the image processing apparatus to adjust the reference level based on at least one of a ratio between dynamic ranges on a low luminance side relative to the reference level before and after dynamic range adjustment and a ratio between dynamic ranges on a high luminance side relative to the reference level before and after dynamic range adjustment.

4. The image processing apparatus according to claim 1, wherein the computer executable instructions further include instructions, that when executed by the processor, cause the image processing apparatus to calculate, based on the luminance histogram, a degree of bias on a low luminance side relative to a central luminance in the luminance histogram, and based on the calculated degree of bias on the low luminance side, to calculate the reference level.

5. The image processing apparatus according to claim 1, wherein the computer executable instructions further include instructions, that when executed by the processor, cause the image processing apparatus to perform tone correction for luminance in a dark part and a bright part in the photographed data according to tone correction tables, and
wherein the tone correction tables to be used for the tone correction are determined based on a dark part correction amount table and a bright part correction amount table held in advance.

6. The image processing apparatus according to claim 1, wherein the computer executable instructions further include instructions, that when executed by the processor, cause the image processing apparatus to switch degrees of correction to be made when determining the input lower limit and the input upper limit and when calculating the reference level.

7. The image processing apparatus according to claim 1, wherein the computer executable instructions further include instructions, that when executed by the processor, cause the image processing apparatus to place a limit when calculating the reference level.

8. The image processing apparatus according to claim 1, wherein the reference level is a level of an input signal targeted for a signal after the gamma correction.

9. The image processing apparatus according to claim 8, wherein the level targeted for the signal after the gamma correction is a luminance level when gray with a reflectivity of 18% is shot.

10. The image processing apparatus according to claim 1, wherein the computer executable instructions further include instructions, that when executed by the processor, cause the image processing apparatus to adjust levels of respective color signals of the photographed data, and
wherein the input lower limit and the input upper limit are determined based on a luminance histogram for the photographed data for which the levels of the respective colors signals have been adjusted.

11. An image processing method for an image processing apparatus which develops photographed data, comprising:
determining, based on a luminance histogram for the photographed data, an input lower limit and an input upper limit of luminance values for use in developing the photographed data;
calculating, based on at least one of the determined input lower limit and the determined input upper limit, a reference level of a gamma curve for use in carrying out gamma correction on the photographed data; and
performing gamma correction on the photographed data using the determined input lower limit and the determined input upper limit and the gamma curve corresponding to the calculated reference level.

12. A non-transitory computer-readable storage medium storing a control program for causing a computer to execute an image processing method for an image processing apparatus which develops photographed data, the image processing method comprising:
determining, based on a luminance histogram for the photographed data, an input lower limit and an input upper limit of luminance values for use in developing the photographed data;
calculating, based on at least one of the determined input lower limit and the determined input upper limit, a reference level of a gamma curve for use in carrying out gamma correction on the photographed data; and
performing gamma correction on the photographed data using the determined input lower limit and the determined input upper limit and the gamma curve corresponding to the calculated reference level.

* * * * *